United States Patent
Lee et al.

(10) Patent No.: US 7,844,151 B2
(45) Date of Patent: Nov. 30, 2010

(54) IN-LINE POLARIZATION-STATE CONVERTER

(75) Inventors: Byeong Ha Lee, Gwangju (KR); Myoung Jin Kim, Gwangju (KR)

(73) Assignee: Gwangju Institute of Science & Technology, Gwangju (KR)

( * ) Notice: Subject to any disclaimer, the term of this patent is extended or adjusted under 35 U.S.C. 154(b) by 25 days.

(21) Appl. No.: 12/366,042

(22) Filed: Feb. 5, 2009

(65) Prior Publication Data
US 2009/0214153 A1 Aug. 27, 2009

Related U.S. Application Data

(62) Division of application No. 11/938,235, filed on Nov. 9, 2007, now abandoned.

(30) Foreign Application Priority Data
Nov. 10, 2006 (KR) ..................... 10-2006-0110776

(51) Int. Cl.
*G02B 6/44* (2006.01)
(52) U.S. Cl. ........................................ 385/110
(58) Field of Classification Search .................. None
See application file for complete search history.

(56) References Cited

U.S. PATENT DOCUMENTS

| 4,389,090 | A | * | 6/1983 | LeFevre | 385/11 |
| 4,793,678 | A | * | 12/1988 | Matsumoto et al. | 385/11 |
| 5,559,907 | A | * | 9/1996 | Inniss et al. | 385/11 |
| 2006/0067618 | A1 | * | 3/2006 | Hill | 385/37 |

* cited by examiner

*Primary Examiner*—Sung H Pak

(57) ABSTRACT

The invention discloses an in-line polarization-state converter. In the polarization converter, a laser beam is radiated onto the side of a photosensitive optical fiber. The laser beam causes the refractive index of an optical fiber core to asymmetrically vary. Birefringence is induced in a core mode of the optical fiber by the variation in the asymmetrical refractive index. An optical fiber segment having the birefringence is generally disposed on a waveguide path of the optical fiber to change the polarization state of an optical signal passing through the optical fiber segment. That is, the phase of the optical signal passing through the optical fiber is changed by radiation of laser beams, which results in a variation in polarization state. The polarization converter disposed on the waveguide path is covered with a metal tube in order to prevent the polarization converter from being bent or broken. In addition, optical fiber connectors are provided at both ends of the polarization converter for easy connection.

11 Claims, 3 Drawing Sheets

[FIG. 1]
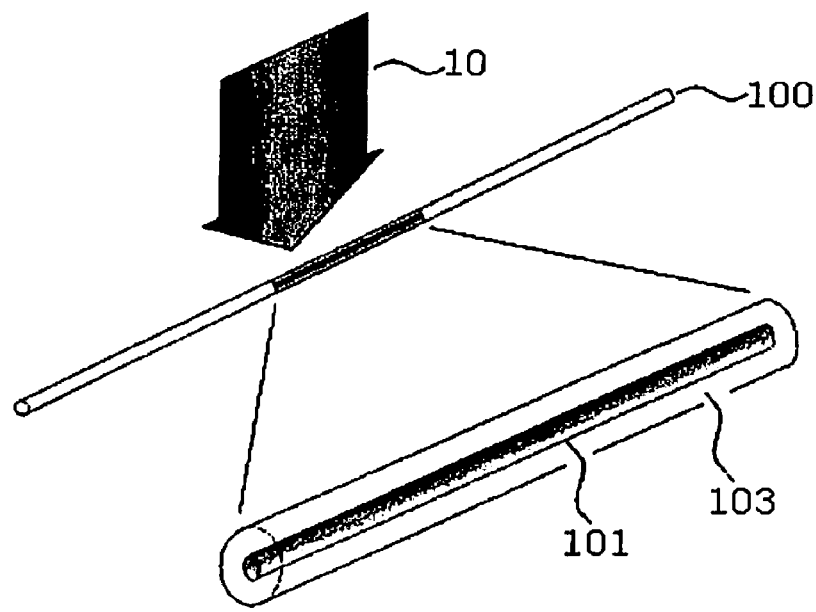
[FIG. 2]
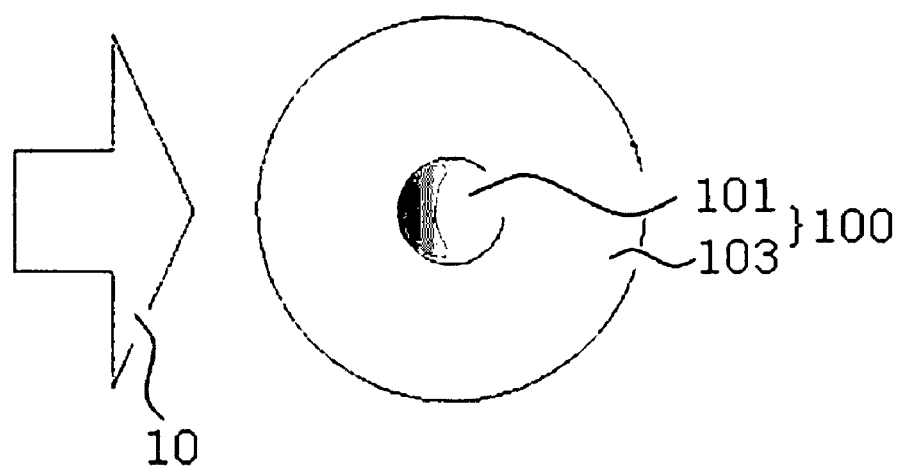
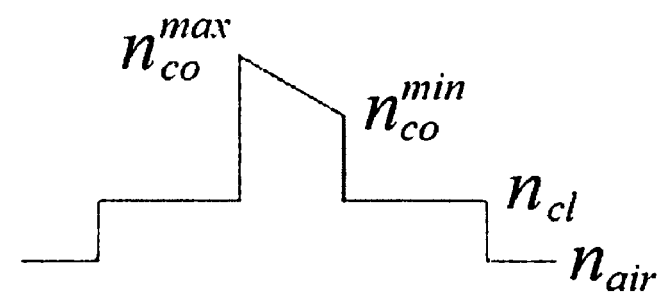

[FIG. 3]
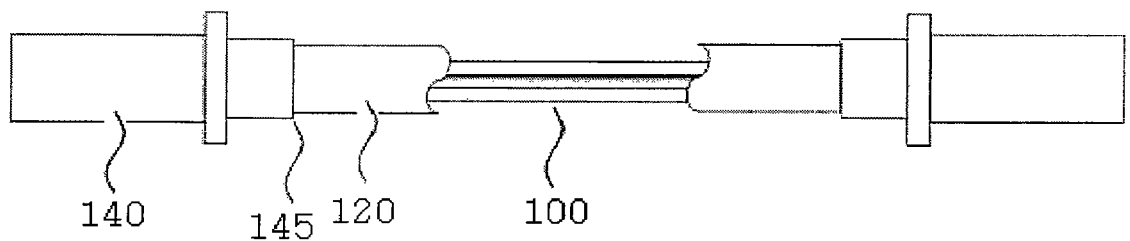
[FIG. 4]
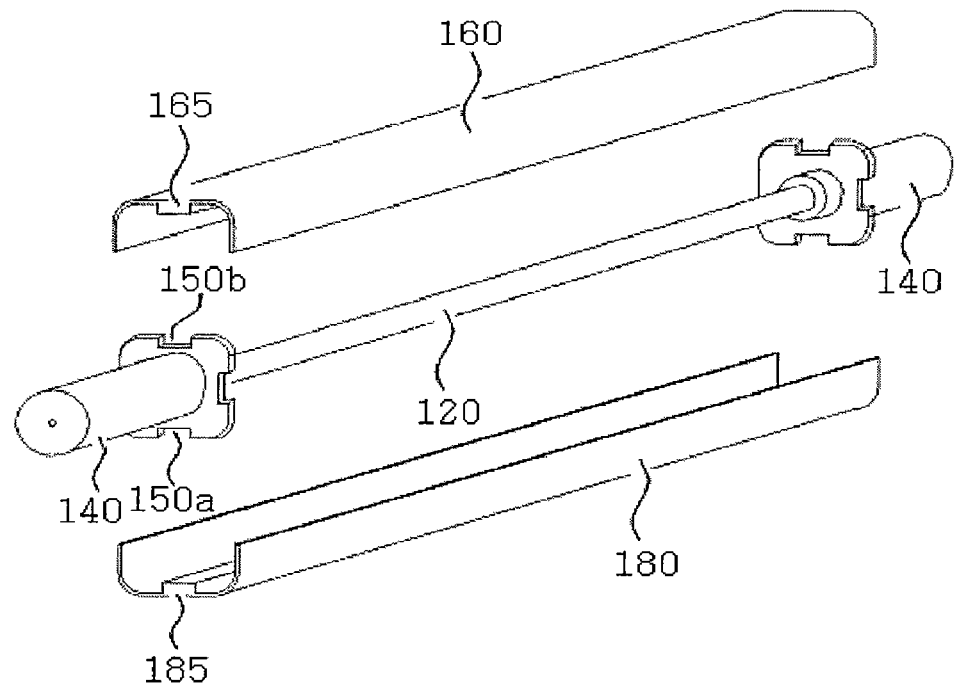

[FIG. 5A]
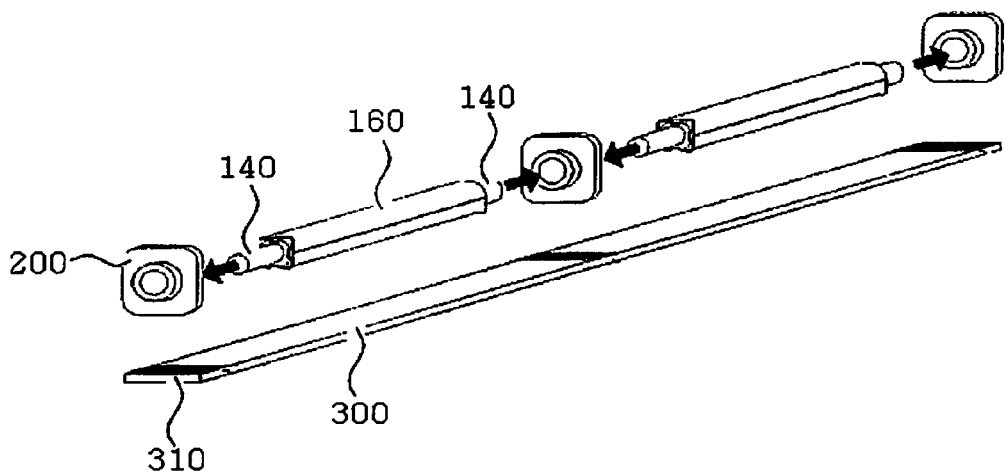
[FIG. 5B]
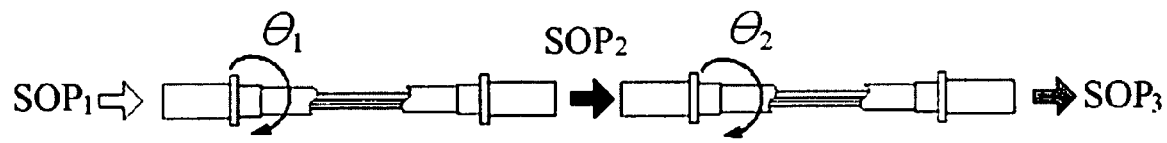
[FIG. 6]
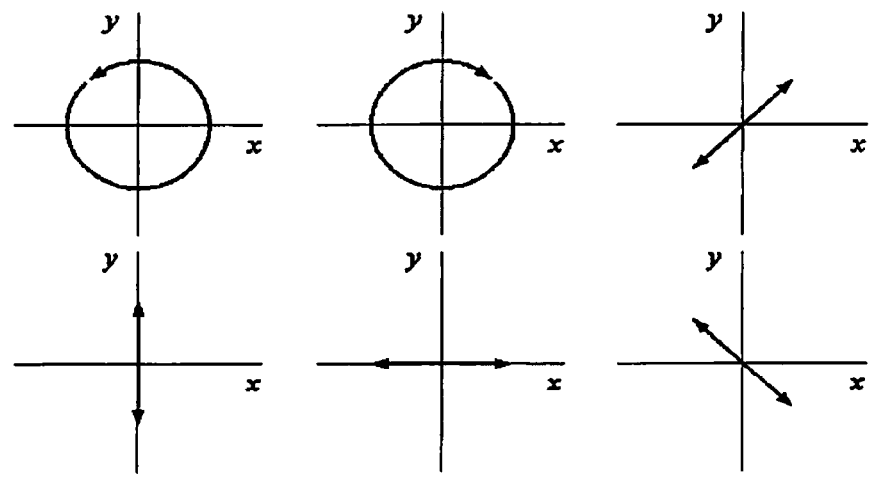

ers and a bulk lens or a lens group to change a polarization state; a method of using a cylindrical piezoelectric element to make an optical fiber have birefringence, thereby changing a polarization state; a method of using the birefringence of an optical fiber grating imprinted on a high birefringence fiber to separate two orthogonal polarization state; and a method of polishing the side of an optical fiber and coating the optical fiber with a metallic material to separate a polarization state.

IN-LINE POLARIZATION-STATE CONVERTER

BACKGROUND OF THE INVENTION

1. Field of the Invention

The present invention relates to an optical device, and more particularly, to a fiber-optic device capable of converting a polarization state in a single mode fiber.

2. Description of the Related Art

A technique for controlling polarization inside an optical fiber has been used for various fields, such as an optical communication field, an optical fiber laser, and an optical fiber gyroscope, and various methods of separating or converting a polarization state have been proposed.

For example, the following methods have been proposed or used: a method of using polarization-maintaining optical fibers having high birefringence or physically deforming the polarization-maintaining optical fiber to change a polarization state; a method of connecting one or more external polarizing elements and a bulk lens or a lens group to change a polarization state; a method of using a cylindrical piezoelectric element to make an optical fiber have birefringence, thereby changing a polarization state; a method of using the birefringence of an optical fiber grating imprinted on a high birefringence fiber to separate two orthogonal polarization state; and a method of polishing the side of an optical fiber and coating the optical fiber with a metallic material to separate a polarization state.

Most of the polarization-maintaining optical fibers have complicated structures. Therefore, the following methods are used in order to change a polarization state: a method of adding other structures (for example, a bow-tie structure or a Panda optical fiber) to the optical fiber having a core and a cladding to apply stress to the core, thereby inducing birefringence; and a method of manufacture an asymmetrical optical fiber core to induce birefringence. However, the polarization-maintaining optical fiber has a complicated structure in order to obtain birefringence, which makes it not easy to manufacture a high birefringence optical fiber. In addition, generally, there is no great connection loss when single-mode optical fibers are connected to each other, but it is difficult to connect different types of optical fibers.

External polarizing elements, such as a thin-film linear polarizer and a wave plate, are known as good polarizing elements. However, since these external polarizing elements need to use separate bulk lenses or lens groups, the manufacturing processes thereof become complicated, and these external polarizing elements are very expensive.

Next, the method of winding an optical fiber on a cylindrical piezoelectric element can adjust a voltage applied to the piezoelectric element to rapidly control the birefringence, and thus induce the difference between the phases of optical signals due to the birefringence. However, in this case, the size of the piezoelectric element needs to be large in order to minimize an optical loss due to the bending of the optical fiber, and a reinforcing member for compensating for birefringence modulation or polarization modulation should be additionally provided on the outside of the optical fiber that is wound around the piezoelectric element.

The method of using the birefringence of the optical fiber grating has a problem in that it is effective for only a specific wavelength due to the wavelength dependency of the optical fiber grating. In the method of polishing the side of an optical fiber and then coating the optical fiber, the optical fiber core having a very small diameter needs to be accurately polished and then coated with a metallic material, which results in a complicated manufacturing process. In addition, the two methods can control only the polarization states orthogonal to each other.

Therefore, a polarization converter capable of controlling the polarization state of an optical signal without using a polarization-maintaining optical fiber or an external polarizing element is needed.

SUMMARY OF THE INVENTION

The present invention is designed to solve the above-mentioned problems, and an object of the invention is to provide a polarization converter capable of converting the polarization state of an optical signal traveling through an optical fiber.

According to an embodiment of the invention, an in-line polarization-state converter includes: optical fiber connectors that are fixed to a support panel; and an optical fiber package that is connected to the optical fiber connectors and rotates to change the polarization state of light incident thereon. In the in-line polarization-state converter, the optical fiber package includes an optical fiber segment whose refractive index is increased by irradiation with a laser beam, and the optical fiber package changes the polarization state of incident light using the optical fiber segment.

In the polarization converter according to the above-mentioned embodiment, a laser beam is radiated onto the side of a general single-mode optical fiber to allow the optical fiber to have birefringence. The optical fiber segment having the birefringence is used to control the polarization state of an optical signal. Therefore, a simple structure is used to control the polarization state, and a general single-mode optical fiber is used. As a result, it is possible to minimize an optical loss due to the connection between different types of optical fibers, and improve the polarization performance and usefulness of an optical fiber.

BRIEF DESCRIPTION OF THE DRAWINGS

FIG. 1 is a diagram illustrating a process of manufacturing an optical fiber segment having birefringence according to an embodiment of the invention.

FIG. 2 is a diagram illustrating an asymmetrical refractive index induced in an optical fiber core according to the embodiment of the invention.

FIG. 3 is a diagram schematically illustrating a package of an optical fiber segment having birefringence according to the embodiment of the invention.

FIG. 4 is an exploded diagram illustrating a structure for preventing the optical fiber segment package shown in FIG. 3 from being twisted according to the embodiment of the invention.

FIG. 5A is a diagram illustrating an assembled in-line polarization-state converter according to the embodiment of the invention.

FIG. 5B is a cross-sectional view illustrating the operation of the in-line polarization-state converter.

FIG. 6 is a diagram illustrating polarization states of incident light converted by the in-line polarization-state converter according to the embodiment of the invention.

DESCRIPTION OF THE PREFERRED EMBODIMENTS

Hereinafter, an exemplary embodiment of the invention will be described in detail with reference to the accompanying drawings.

Embodiments

FIG. 1 is a diagram illustrating a process of manufacturing an optical fiber segment having birefringence according to an embodiment of the invention.

Referring to FIG. 1, a laser beam 10 is radiated onto the side of an optical fiber 100. In a region onto which the laser beam 10 is radiated, a refractive index of an optical fiber core 101 asymmetrically increases. The laser beam 10 has a wavelength range of 100 nm to 1050 nm.

FIG. 2 is a diagram illustrating the asymmetric refractive index of the optical fiber core 101 induced by the laser beam according to the embodiment of the invention.

Referring to FIG. 2, when the laser beam 10 is radiated onto the left size of the optical fiber 100, the optical fiber core 101 has a relatively-large refractive index at the left side. When the laser beam 10 is radiated onto the left and right sides of the optical fiber 100, the optical fiber core 101 has a large refractive index at the left and right sides. As can be seen from FIG. 2, in the region onto which the laser beam 10 is radiated, the refractive index of the optical fiber 100 asymmetrically increases, as compared to regions that are not irradiated with the laser beam 10.

In FIGS. 1 and 2, methods of inducing a variation in refractive index in the optical fiber core 101 are divided into two kinds of methods, that is, methods of using a chemical reaction and methods of using a physical reaction.

First, the methods of using a chemical reaction are divided into two methods. First, an optical fiber is put into a high-pressure vessel whose internal pressure is kept at about 100 atmospheres and which contains liquid hydrogen having a high degree of purity, and then the optical fiber is heated at a temperature of 100° C. Then, the optical fiber is hydrogenated, and an UV laser beam is radiated onto the hydrogen-loaded optical fiber. Second, a UV laser beam is radiated onto a photosensitive optical fiber including an optical fiber core having boron co-doped thereto.

In general, an optical fiber includes a core region 101 formed of $GeO_2$ and $SiO_2$, and a cladding region 103 formed of only $SiO_2$. When the optical fiber is hydrogenated, hydrogen molecules are uniformly distributed in the entire region of the optical fiber. Then, when a UV laser beam is radiated onto the optical fiber, $GeO_2$ molecules contained in the core region react with hydrogen molecules, so that the refractive index of the optical fiber core 101 is changed.

Meanwhile, in the case of the photosensitive optical fiber including a core having boron co-doped thereto, boron molecules react with the hydrogen molecules, so that the refractive index of the optical fiber core 101 is changed. The variation in refractive index by the chemical reaction may be caused by a laser beam having a wavelength in the range of 100 nm to 350 nm. In this case, the degree of the variation in refractive index is proportional to the intensity of a UV laser beam radiated. When the UV laser beam is radiated onto the side of the optical fiber 100, the amounts of UV laser beams incident on the cross section of the optical fiber are different from each other due to the scattering of light caused by the structure of the optical fiber. As a result, the optical fiber has an asymmetric refractive index, which is shown in FIG. 2.

In the method of physically changing a refractive index, a heat treatment is performed on the optical fiber 100 using a high power laser emitting a laser beam having a wavelength of 500 nm to 1050 nm, thereby changing the structure of the optical fiber. When the geometrical structure of the optical fiber 100 is changed, the traveling conditions of light vary, and thus an effective refractive index is changed. When the geometrical structure of the optical fiber is asymmetrical, a difference in effective refractive index occurs, which results in birefringence.

A polarization converter according to the embodiment of the invention uses the birefringence that can be induced in the optical fiber 100 by various methods.

FIG. 3 is a diagram illustrating a package of an optical fiber segment having the birefringence according to the embodiment of the invention.

Referring to FIG. 3, the optical fiber segment 100 having the birefringence that is formed by radiation of the laser beam shown in FIG. 1 is packaged by a metal tube 120 and optical fiber ferrules 140.

For example, the optical fiber segment 100 having a birefringence section of about 2 cm or less is wrapped up in the metal tube 120. The metal tube 120 protects the optical fiber segment 100 having the birefringence. In addition, in order to easily perform optical connection, the optical fiber ferrules 140 are provided at both ends of the optical fiber segment 100.

Further, connecting portions 145 are fixed by epoxy in order to reduce the influence of the bending and tensile force of an optical fiber.

FIG. 4 is an exploded view illustrating a structure for preventing the optical fiber segment package shown in FIG. 3 from being twisted.

Referring to FIG. 4, the optical fiber segment package shown in FIG. 3 has grooves 150a and 150b provided in the optical fiber ferrules 140. A housing is provided outside the optical fiber segment 100. Preferably, the housing includes an upper housing 160 and a lower housing 180.

The grooves 150a and 150b prevent a variation in polarization due to the twist of the optical fiber when the optical fiber segment is rotated. The groove 150a provided in the optical fiber ferrule 140 is engaged with the lower housing 180. That is, a first protruding portion 185 of the lower housing 180 is fitted to the groove 150a. In addition, the groove 150b provided in the optical fiber ferrule is engaged with the upper housing 160. That is, a second protruding portion 165 of the upper housing 160 is fitted to the groove 150b.

The upper housing 160 and the lower housing 180 are provided so as to cover the outside of the metal tube 120 for protecting the optical fiber segment. In this embodiment, the upper housing 160 and the lower housing 180 are separated from each other, but the invention is not limited thereto. For example, the upper housing 160 and the lower housing 180 may be integrated into one housing. In this case, the package including the optical fiber ferrules 140, the grooves 150a and 150b, and the metal tube 120 shown in FIG. 3 are inserted into the housing. One housing has one or more protrusions, and protrusions are fitted to the grooves to prevent an optical fiber from being twisted when the optical fiber segment is rotated.

FIG. 5A is a diagram illustrating an assembled in-line polarization-state converter according to the embodiment of the invention, and FIG. 5B is a cross-sectional view illustrating the operation of the in-line polarization-state converter.

Referring to FIG. 5A, the optical fiber package shown in FIG. 4 is connected to optical fiber connector adapters 200. The optical fiber connector adapters 200 are fixed to a lower support panel 300. The optical fiber connector adapters 200 are fixed to the lower support panel 300 by an adhesive portion 310.

The optical fiber package can be independently rotated by the optical fiber connector adapters 200 fixed to the lower support panel 300.

Referring to FIG. 5B, a polarization state $SOP_1$ of an initial optical signal is converted into a polarization state $SOP_2$ by the birefringence of a first optical fiber segment. In this case, the polarization state $SOP_2$ is converted depending on a rotation angle $\theta_1$ of the first optical fiber segment.

In addition, the polarization state $SOP_2$ is converted into a polarization state $SOP_3$ by a second optical fiber segment. As a result, the polarization state $SOP_1$ is converted into the polarization state $SOP_2$ according to the rotation angle of the first optical fiber segment, and the polarization state $SOP_2$ is converted into the polarization state $SOP_3$ due to a variation in the birefringence axis of the second optical fiber segment. In this way, it is possible to obtain various polarization states.

In FIGS. 5A and 5B, two optical fiber segment packages are provided to change polarization state two times, but the invention is not limited thereto. The number of optical fiber segments may depend on the number of polarization states. That is, in order to change the polarization state once, one optical fiber segment package may be used. The number of optical fiber segment packages may depend on the number of polarization states.

FIG. 6 is a diagram illustrating polarization states of incident light converted by the in-line polarization-state converter according to the embodiment of the invention.

Referring to FIG. 6, incident light can be polarized in various states by the in-line polarization-state converter. FIG. 6 shows representative polarization states, but the invention is not limited thereto. Incident light may be polarized in various states according to the rotation angle of the optical fiber segment having birefringence.

According to the above-described embodiment of the invention, a laser beam is radiated onto the side of an optical fiber segment to allow the optical fiber segment to have birefringence. Then, when an optical signal travels through the optical fiber segment, the phase of the optical signal is changed, so that the polarization state of the optical signal varies. In the in-line polarization-state converter, the optical fiber segment is covered with a metal tube in order to prevent the optical fiber segment from being bent or broken, and optical fiber connectors are provided at both ends of the optical fiber segment for easy connection. Therefore, it is not necessary to use an external polarizing element, such as a polarizer or a wave plate, or a lens system for optical connection between the polarizing elements, and it is possible to easily connect optical fiber segments by using optical fiber connectors.

As described above, according to the embodiment of the invention, a laser beam is radiated onto an optical fiber to allow an optical fiber segment to have birefringence. A polarization converter uses the optical fiber segment having the birefringence to control the polarization state of an optical signal traveling through the optical fiber segment. The polarization converter capable of controlling the polarization state can minimize optical loss caused by connection between different types of optical fibers. As a result, the polarizing performance and usefulness of the polarization converter can be improved.

It will be apparent to those skilled in the art that various modifications and changes may be made without departing from the scope and spirit of the present invention. Therefore, it should be understood that the above embodiments are not limitative, but illustrative in all aspects. The scope of the present invention is defined by the appended claims rather than by the description preceding them, and therefore all changes and modifications that fall within metes and bounds of the claims, or equivalents of such metes and bounds are therefore intended to be embraced by the claims.

What is claimed is:

1. A method for manufacturing an in-line polarization-state converter, the method comprising:
    radiating a laser beam onto a first side of an optical fiber segment to increase a refractive index of the first side of the optical fiber segment;
    enclosing the optical fiber segment with a metal tube;
    forming optical fiber ferrules at both ends of the optical fiber segment, and providing a housing on the outside of the metal tube, thereby forming an optical fiber package; and
    connecting the optical fiber package to optical fiber connector adaptors,
    wherein the refractive index of the first side of the optical fiber segment is larger than a refractive index of a second side of the optical fiber segment, thereby the refractive index of the optical fiber segment asymmetrically increased,
    wherein the housing has a lower housing and an upper housing,
    wherein a first protruding portion of the lower housing is coupled with a first groove provided in each of the optical fiber ferrules, and a second protruding portion of the lower housing is coupled with a second grove provided in each of the optical fiber ferrules.

2. The method according to claim 1, wherein the laser beam has a wavelength in the range of 100 nm to 350 nm, and is radiated onto the optical fiber segment to induce a chemical reaction in the optical fiber segment, thereby increasing the refractive index of the optical fiber segment.

3. The method according to claim 1, wherein the laser beam has a wavelength in the range of 500 nm to 1050 nm, and is radiated onto the optical fiber segment to induce a physical reaction in the optical fiber segment, thereby increasing the refractive index of the optical fiber segment.

4. A method for manufacturing an in-line polarization-state converter, the method comprising:
    radiating a laser beam onto a left side of an optical fiber segment to increase a refractive index of the left side of the optical fiber segment;
    enclosing the optical fiber segment in a conductive tube;
    forming an optical fiber ferrule at each end of the optical fiber segment;
    providing a housing enclosing the conductive tube, thereby forming an optical fiber package; and
    connecting the optical fiber package to one or more optical fiber connector adaptors,
    wherein the refractive index of the left side of the optical fiber segment is larger than a refractive index of a right side of the optical fiber segment, thereby the refractive index of the optical fiber segment asymmetrically increased,
    wherein the housing has a lower housing and an upper housing,
    wherein a first protruding portion of the lower housing is coupled with a first groove provided in each of the optical fiber ferrules, and a second protruding portion of the lower housing is coupled with a second grove provided in each of the optical fiber ferrules.

5. The method according to claim 4, wherein the laser beam has a wavelength in the range of 100 nm to 350 nm, and is radiated onto the optical fiber segment to induce a chemical reaction in the optical fiber segment.

6. The method of claim 5, wherein the conductive tube is a metal tube.

7. The method according to claim 4, wherein the laser beam has a wavelength in the range of 500 nm to 1050 nm, and is radiated onto the optical fiber segment to induce a physical reaction in the optical fiber segment.

8. An in-line polarization-state converter, comprising:

optical fiber connector adaptors fixed to a support panel; and an optical fiber package connected to the optical fiber connectors, the optical fiber package being configured to be rotated and change a polarization state of light incident thereon, the optical fiber package including an optical fiber segment that has an asymmetric refractive index, wherein the optical fiber package is configured to change the polarization state of the incident light using the optical fiber segment, wherein the asymmetric refractive index of the optical fiber segment is obtained by irradiating a left side of the optical fiber segment with a laser beam, wherein the refractive index of the left side of the optical fiber segment is larger than a refractive index of a right side of the optical fiber segment, thereby the refractive index of the optical fiber segment being asymmetrically increased, wherein the optical fiber package includes a metal tube on an exterior of the optical fiber segment, an optical fiber ferrules at both ends of the optical fiber segment and a housing on an exterior of the metal tube, wherein the housing has a lower housing and an upper housing, wherein a first protruding portion of the lower housing is coupled with a first groove provided in each of the optical fiber ferrules, and a second portion of the lower housing is coupled with a second grove provided in each of the optical fiber ferrules.

9. The converter of claim 8, wherein the asymmetric refractive index of the optical fiber segment is obtained by irradiating the optical fiber segment with a laser beam.

10. The method according to claim 1, wherein the first and the second sides of the optical fiber segment are arranged on substantially the same cross-sectional surface of the optical fiber segment.

11. The method according to claim 1, wherein the first side of the optical fiber segment is a left side and the second sides of the optical fiber segment is a right side.

* * * * *